United States Patent [19]
Seitz et al.

[11] Patent Number: 5,864,618
[45] Date of Patent: Jan. 26, 1999

[54] TELEPHONE SET HAVING AN ANTI-FRAUD ARRANGEMENT WHICH PREVENTS ANY FRAUDULENT ATTEMPT TO THE TELEPHONE

[75] Inventors: Thomas Seitz, Genève; Urs Falk, Steinhausen, both of Switzerland

[73] Assignee: Electrowatt Technology Innovation AG, Zug, Switzerland

[21] Appl. No.: 894,875

[22] PCT Filed: Jan. 15, 1996

[86] PCT No.: PCT/CH96/00017

§ 371 Date: Dec. 3, 1997

§ 102(e) Date: Dec. 3, 1997

[87] PCT Pub. No.: WO96/25000

PCT Pub. Date: Aug. 15, 1996

[30] Foreign Application Priority Data

Feb. 10, 1995 [CH] Switzerland .............................. 391/95
Jun. 8, 1995 [EP] European Pat. Off. .............. 95108824

[51] Int. Cl.$^6$ ............................ H04M 17/00; H04M 1/00
[52] U.S. Cl. ............................................ 379/419; 379/145
[58] Field of Search .................................. 379/419, 428, 379/435, 145, 146, 150

[56] References Cited

U.S. PATENT DOCUMENTS 4,759,054 7/1988 Mellon .
5,022,073 6/1991 Jordan ..................................... 379/145
5,086,459 2/1992 Perry .
5,150,403 9/1992 Jordan .

FOREIGN PATENT DOCUMENTS 0 310 371 A2 4/1989 European Pat. Off. .
0 727 898 B1 9/1996 European Pat. Off. .
2 434 529 8/1978 France .
41 20 079 A1 12/1992 Germany .

*Primary Examiner*—Jack Chiang
*Attorney, Agent, or Firm*—Proskauer Rose LLP

[57] ABSTRACT

A telephone station (1) having a handset (14) can be connected to a telephone exchange (5) by means of first and second switches (6, 7) by way of two lines (2, 3). When the switches (6, 7) are closed the telephone station (1) can be supplied with electrical energy from the telephone exchange (5) by way of the lines (2, 3). Within the telephone station (1) the first switch (6), a first coil (8), a circuit member (10), a second coil (9) and the second switch (7) are electrically connected in series. The switches (6, 7) are actuable by the handset (14) of the telephone station (1). The two coils (8, 9) are wound in opposite directions around a body (12) of magnetic material. There are also provided a measuring coil (11) and a measuring circuit (13) for producing an alternating magnetic field in the body (12) and for measuring the time derivation dB/dt of the magnetic induction B(t) which occurs in the body (12) and for producing a signal for opening the switches (6, 7) if the measured derivation dB/dt fulfills predetermined criteria. The coils (8, 9), the magnetic body (12), the measuring coil (11) and the measuring circuit (13) serve to prevent attempts at fraud.

10 Claims, 2 Drawing Sheets

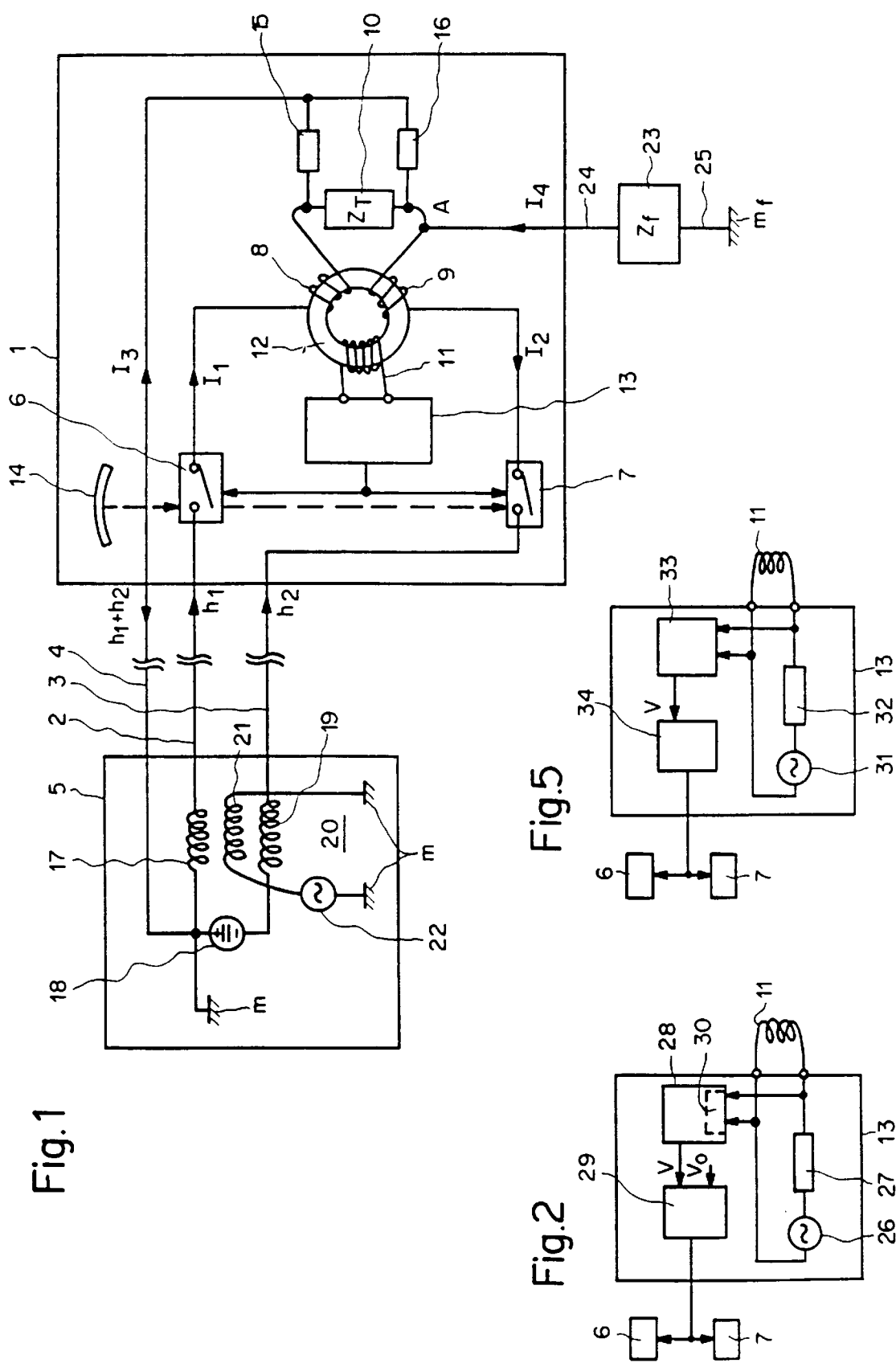

5,864,618

TELEPHONE SET HAVING AN ANTI-FRAUD ARRANGEMENT WHICH PREVENTS ANY FRAUDULENT ATTEMPT TO THE TELEPHONE

BACKGROUND OF THE INVENTION

The invention concerns a telephone station of the kind set forth in the classifying portion of claim 1.

SUMMARY OF THE INVENTION

The object of the present invention is to propose a telephone station having an anti-fraud arrangement which prevents any fraudulent attempt to telephone from the telephone station without paying the charges which are incurred.

In accordance with the invention that object is attained by the features of claims 1 and 7. Advantageous configurations are set forth in the appendant claims.

BRIEF DESCRIPTION OF THE DRAWING

Embodiments of the invention are described in greater detail hereinafter with reference to the drawing in which:

is FIG. 1 is an electrical diagram of a telephone station connected to a telephone exchange, FIG. 2 shows a measuring circuit, FIG. 5 shows a measuring circuit for measuring the input impedance of a transformer.

DESCRIPTION OF THE PREFERRED EMBODIMENTS

Figure 3:
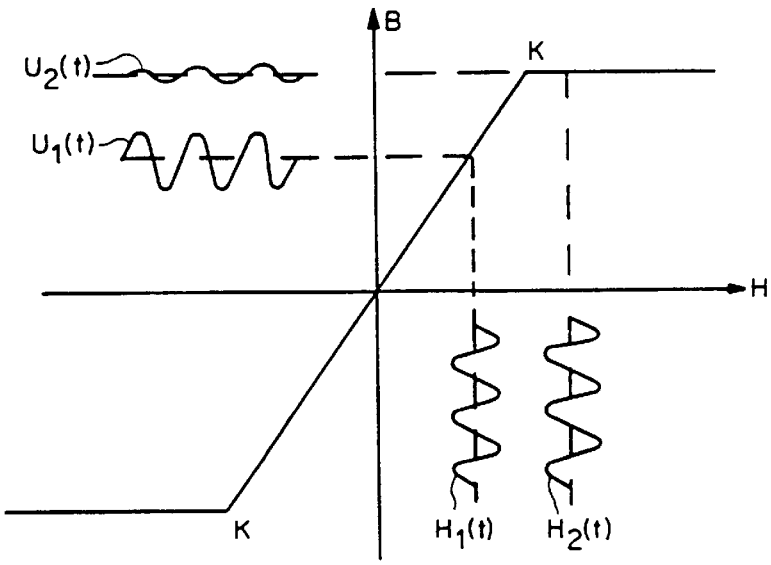
FIG. 3 shows a magnetisation curve and signal shapes.

FIG. 1 shows the electrical circuit diagram of a public telephone station 1 which is connected by way of three lines 2, 3 and 4 to a telephone exchange 5. It has two switches 6 and 7, first and second coils 8 and 9 respectively, a circuit member 10, a measuring coil 11, a body 12 of magnetic material and a measuring circuit 13. The switch 6, the first coil 8, the circuit member 10, the second coil 9 and the switch 7 are electrically connected in series. The switches 6 and 7 are connected on their output sides to the lines 2 and 3 respectively and are actuated by the handset 14 of the telephone station 1. They are opened when the handset 14 is put down and they are closed when the handset 14 is lifted off. The circuit member 10 has two connections which are each connected to the line 4 by way of a respective resistor 15 and 16. The circuit member 10 is the actual core portion of the telephone station 1. From the electrical point of view it represents an impedance $Z_T$. Further details about the structure of the circuit member 10 are not essential for understanding of the invention and are therefore not described herein.

Within the telephone exchange 5 the first line 2 is connected by way of a coil 17 to an earthed point m, to the line 4 which serves as an earth line, and to a positive terminal of a dc voltage source 18. The second line 3 is connected by way of a coil 19 to the negative terminal of the dc voltage source 18. The telephone exchange 5 has an earthed circuit 20 with a coil 21 and an ac voltage generator 22 which serve inter alia for modulating fee charge pulses onto the two lines 2 and 3. The charge pulses are alternating signals which are generally at a frequency of 50 Hz. The charge pulses are received by the circuit member 10 of the telephone station 1 and are used for example for direct debiting of a credit which has been produced by the insertion of coins or similar payment means. It is also possible that the telephone station 1 firstly adds up the charge pulses and later uses them for billing purposes, for example in the case of cash-less payment by means of a credit card or a chip card.

An electric circuit 23 is connected to the telephone station 1, in the event of intent to defraud. A first feed wire 24 of the circuit 23 is electrically connected to a tapping A of the telephone station 1, which is between the circuit member 10 and the second coil 9. A second feed wire 25 of the circuit 23 is connected to an earthed point $m_f$. From the electrical point of view the circuit 23 represents an impedance $Z_f$ arranged between the two feed wires 24 and 25. Depending on the kind of fraud involved the circuit 23 can be a telephone or a circuit for weakening the charge pulses.

When the handset 14 is lifted up, a dc circuit is closed: a direct current $I_1$, flows through the first line 2 from the positive terminal of the dc voltage source 18 by way of the circuit member 10 to the tapping A, a direct current $I_2$ flows through the second line 3 from the tapping A to the negative terminal of the dc voltage source 18 and a further direct current $I_3$ flows through the earth line 4 from the positive terminal of the dc voltage source 18 to the tapping A. The direct currents are linked by the relationship $I_2=I_1+I_3$. The direct currents $I_1$, and $I_2$ are of the order of magnitude of 100 mA. The direct current $I_3$ is very low in comparison with the direct currents $I_1$, and $I_2$ as the resistors 15 and 16 are of very high resistance in comparison with the impedance $Z_T$ of the circuit member 10. In that way the telephone station 1 can be supplied with electrical energy from the telephone exchange 5 by way of the two lines 2 and 3.

The charge pulses represent alternating current pulses $h_1$, and $h_2$ which pass from the telephone exchange 5 on both lines 2 and 3 parallel to the telephone station 1 and flow to earth by way of the resistors 15 and 16 respectively and the line 4. The strength of the current pulses $h_1$, and $h_2$ is generally a few or a few tens of microamperes and is thus very small in comparison with the strength of the direct currents $I_1$, and $I_2$.

If no circuit 23 is connected to the tapping A with intent to defraud, then the two direct currents $I_1$, and $I_2$ are almost of equal magnitude in terms of amount. If however a telephone is connected as the circuit 23 a further current $I_4$ flows from the earth $m_f$ by way of the impedance $Z_f$ to the tapping A and to the negative terminal of the dc voltage source 18. In accordance with the node rule the following relationship applies:

$$I_2=I_1+I_3+I_4.$$

The coils 8 and 9, the measuring coil 11, the magnetic body 12 and the measuring circuit 13 represent an arrangement for preventing attempts at fraud by means of a telephone 23. As shown, the coils 8 and 9 are wound in opposite directions around the body 12 and have the same number $N_1$ of turns. The body 12 is in the form of a torus. The direct currents $I_1$, and $I_2$ respectively which flow through the coils 8 and 9 generate in the torus 12 a magnetic field $H_{AJ}$, which is proportional to the difference between the direct currents $\Delta I=I_1-I_2$ and the turns number $N_1$: $H_{AJ}\sim\Delta I*N_1$. The measuring coil 11 is also wound around the torus 12.

FIG. 2 shows a first embodiment of the measuring circuit 13 which includes an alternating current source which is connected to the two connections of the measuring coil 11 and which is formed from an ac voltage source 26 and a resistor 27 which are connected in series, a voltage measuring device 28 for measuring the voltage across the measuring coil 11 and a comparison circuit 29. The voltage measuring device 28 outputs a dc voltage V which the comparison circuit 29 compares to a predetermined threshold value $V_0$. At its output the comparison circuit 29 supplies a binary signal which can assume the values "0" or "1". The value "0" means that the dc voltage V is greater than the value $V_0$, and the value "1" means that the dc voltage V is less than the value $V_0$. The output of the comparison circuit 29 is so taken to the switches 6 and 7 that the signal "0" leaves the position of the switches 6 and 7 unchanged and the signal "1" causes opening of the switches 6 and 7.

When the switches 6 and 7 open the telephone station 1 can no longer be supplied with electrical energy from the telephone exchange 5. So that the switches 6 and 7 do not immediately close again when the energy supply ceases when the handset 14 is lifted off, but only after the handset 14 has been set down and lifted off again, they are in the form of bistable switches, for example bistable relays. If the telephone 23 is still connected after the handset 14 has been lifted off again, the measuring circuit 13 immediately causes opening of the switches 6 and 7 again.

The measuring coil 11 serves on the one hand together with the alternating current source 26, 27 for producing an alternating magnetic field $H_H(t)$ in the torus 12 which is superimposed on the magnetic field $H_{AI}$ produced by the direct currents $I_1$ and $I_2$. On the other hand the measuring coil 11 serves to measure the time derivation of the magnetic induction B(t) which occurs in the torus 12 on the basis of the magnetisation curve B(H). Those two functions could also be effected by means of two measuring coils.

In a first embodiment the torus 12 (FIG. 1) comprises a soft-magnetic material which has a magnetisation curve B(H) as is qualitatively shown in FIG. 3. For magnetic fields H whose absolute value is below a value $H_K$, the magnetic induction B(H) is proportional to H and the slope dB/dH, that is to say magnetic permeability $\mu_r$, is great in relation to the value one: $\mu_r \gg 1$. For magnetic fields H whose absolute value is above the value $H_K$, the slope dB/dH is much less. The magnetic material comes into or is in a condition of saturation: magnetic permeability $\mu_r$ approaches the value one. In the case of the field $H_K$ the magnetisation curve B(H) has the known break point K. The number $N_1$ of turns of the coils 8 and 9 is now established at $N_1=25$ so that a current difference of $\Delta I=2$ mA generates a magnetic field $H_{AI}$, which is lower than the field $H_K$ and thus does not put the torus 12 magnetically into a condition of saturation, and that a current difference of $\Delta I=4$ mA generates a magnetic field $H_{AI}$, which is clearly greater than the field $H_K$ and brings the torus 12 into a condition of saturation. The magnetic material must have the property that the transition from a high permeability to a low permeability occurs in a range $\Delta H$ which is comparatively low in relation to the value $H_K$: $\Delta H \ll H_K$, so that the maximum permissible current difference $\Delta I_s$ which is not yet interpreted as an attempt at fraud can be well defined. In the jargon in the art, this is referred to as a sharp break point.

The ac voltage source 26 generates an ac voltage at a frequency $\omega_M$ which is somewhere in the range of from about 5 to 100 kHz, and the resistor 27 is of a value of about 10 kΩ. That value is great in relation to the magnitude of the impedance of the measuring coil 11 at the frequency $\omega_M$ so that an alternating current $I_M(t)$ of predetermined relatively low amplitude flows through the measuring coil 11. The alternating current $I_M(t)$, generates a measuring field $H_M(t)$ in the torus 12, which is superimposed on the field $H_{AI}$. The measuring field $H_M(t)$ is proportional to the alternating current $I_M(t)$ and to the number $N_2$ of turns of the measuring coil 11, which is about $N_2=250$. The high number of turns $N_2$ serves to generate a relatively strong measuring field $H_M(t)$ at a comparatively low alternating current $I_M(t)$ of a few $\mu A$ so that the measuring circuit 13 consumes little energy. With an alternating current $I_M(t)$ of 10 $\mu A$ the measuring field $H_M(t)$ is smaller approximately by a factor of 20 than the magnetic field $H_{AI}$ with a current difference of $\Delta I=2$ mA. The voltage measuring device 28 measures the voltage U(t) which is across the measuring coil 11 and which is proportional to the time derivation of the magnetic flux $\phi(t)$ through the measuring coil 11 and thus also proportional to the time derivation of the magnetic induction B(t) which occurs because of the magnetic field $H(t)=H_{AI}+H_M(t)$ in the torus 12.

Besides the hysteresis-less magnetisation curves B(H) and B($\Delta I$) respectively, FIG. 3 shows magnetic fields $H_1(t) = H_{AI,1}+H_M(t)$ and $H_2(t)=H_{AI,2}+H_M(t)$ and the voltages U(t) $=U_1(t)$ and $U(t)=U_2(t)$ respectively which occur, wherein the current difference in the first case is $\Delta I=2$ mA and in the second case $\Delta I_2=4$ mA. The amplitudes of the magnetic field $H_M(t)$ and the voltages $U_1(t)$ and $U_2(t)$ are shown on an enlarged scale for the purposes of illustration. The shape of the alternating current exciting the measuring coil 11 is not of particular significance. A sawtooth alternating current can be easily produced.

The magnetic field $H_1(t)$ still does not put the torus 12 (FIG. 1) into a condition of saturation so that the variation in respect of time of the magnetic induction B(t) which occurs in the torus 12, corresponding to the high slope dB/dH of the magnetisation curve B(H), in front of the break point K, produces in the measuring coil 11 a voltage $U_1(t)$ of a comparatively high amplitude. In the case of the magnetic field $H_2(t)$ the torus 12 is magnetically saturated because of the constant field component $H_{AI,2}$ so that the field B(t), corresponding to the slope dB/dH of the magnetisation curve B(H) after the break point K, experiences only very slight changes in respect of time. The amplitude of the voltage $U_2(t)$ is therefore vanishingly small. The voltages $U_1(t)$ and $U_2(t)$ are alternating and do not have any dc voltage component.

In the first case, that is to say when the voltage $U_1(t)$ is present, the voltage measuring device 28 produces a dc voltage V which is greater than the value $V_0$. In the second case, that is to say when the voltage $U_2(t)$ is present, the dc voltage V is lower than the value $V_0$. A difference $\Delta I$ between the two direct currents $I_1$, and $I_2$, which is greater than the predetermined threshold value $\Delta I_s$, therefore causes opening of the switches 6 and 7. The telephone station 1 is thus adapted to detect and prevent any attempt to telephone with a telephone 23 which is connected to the telephone station 1 as described above.

The magnetisation curve B(H) shown in FIG. 3 corresponds to the ideal case. In actual fact any ferromagnetic material has hysteresis effects which express themselves in the form of finite remanence $B_r$ and a finite coercive field strength $H_c$. So that the measuring device automatically functions satisfactorily again after an attempt at fraud which has been broken off without success, it is necessary for the remanence $B_r$ of the magnetic material to be sufficiently low. More specifically in this connection a low remanence $B_r$ means that the magnetic field B in the torus 12 assumes a value which is significantly below the saturation value $B(H_K)$ as soon as the difference $\Delta I$ of the currents $I_1$, and $I_2$ and therewith also the magnetic field $H_{AI}$ produced by them disappears. By virtue of the high permeability $\mu_r$ a low remanence $B_r$ also means a low coercive field strength $H_c$. Materials which come very close to an ideal magnetisation curve B(H) of that kind are for example metal glasses, that is to say amorphous ferromagnetic materials. A metal glass with a low remanence $B_r$ and a low coercive field strength $H_c$ is commercially available under the designation VITROVAC 6025 F. That metal glass has a transverse anisotropy which results in a so-called F-loop characteristic of the magnetisation curve B(H).

In a second embodiment the measuring circuit 13 (FIG. 2) operates the measuring coil 11 as a so-called Fluxgate Sensor. For that purpose the alternating current source 26, 27 is of a different size, the voltage measuring device 28 has a band pass filter 30 and the comparison circuit 29 has an inverter connected downstream thereof. The current source formed from the ac voltage source 26 and the resistor 27 supplies a preferably sawtooth alternating current $I_F$ at a fundamental frequency $\omega_f$, wherein the amplitude thereof and the number $N_2$ of turns of the measuring coil 11 are so matched to each other that the magnetic field $H_F$ produced by the alternating current $I_F$ in the measuring coil 11 periodically brings the torus 12 into a condition of saturation, that is to say the amplitude of the alternating current $I_F$ produces a magnetic field H which is greater than the field $H_K$. The band pass filter 30 is transmitting for at least one even harmonic of the fundamental frequency $\omega_f$, preferably for the first even harmonic at the frequency $2^*\omega_f$.

Figure 4:
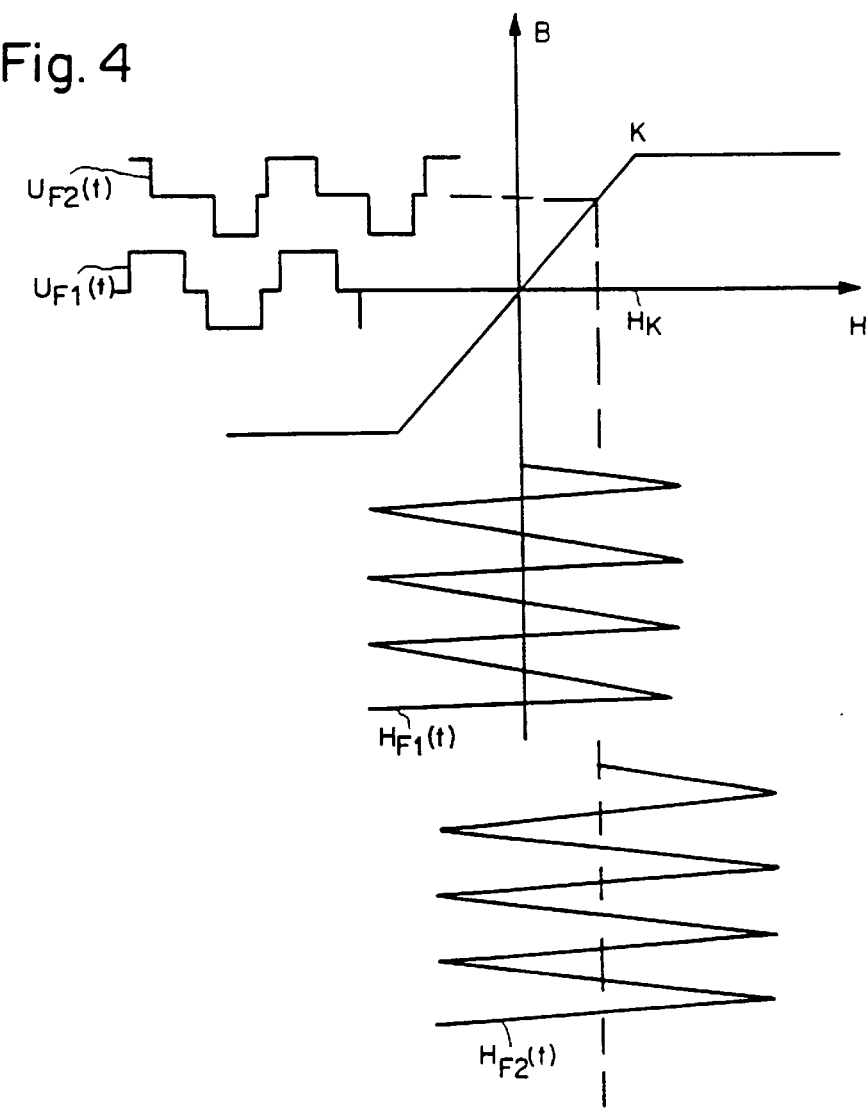
FIG. 4 shows a magnetisation curve and current and voltage configurations.

FIG. 4 shows the configuration in respect of time of the magnetic field $H_F(t)=H_{F1}(t)$ and $H_F(t)=H_{F2}(t)$ respectively and the voltage $U(t)=U_{F1}(t)$ and $U(t)=U_{F2}(t)$ respectively across the measuring coil 11. In the first case the current difference $\Delta I$ to be measured is zero. The magnetic field $H_{F1}(t)$ is thus without a constant field component. The voltage $U_{F1}(t)$ which is again proportional to the variation in respect of time of the magnetic flux $\phi(t)$ and thus proportional to the variation in respect of time of the magnetic field B(t) assumes a configuration formed from positive and negative rectangular pulses. The positive and negative rectangular pulses of the voltage $U_{F1}(t)$ are of an even curve shape and the frequency spectrum of the voltage $U_{F1}(t)$ contains only odd harmonics. A vanishing dc voltage V is present at the output of the voltage measuring device 28 and the comparison circuit 29 carries the signal "1". With an increasing current difference $\Delta I$ the constant field component of the magnetic field $H_{F2}(t)$ increases. Because the torus 12 is put into a condition of magnetic saturation, the positive and negative rectangular pulses change in respect of length and position on the time axis and the frequency spectrum of the voltage $U_{F2}(t)$ also has even harmonics. By virtue of the upstream-disposed band pass filter 30 the voltage measuring device 28 measures the strength of the second harmonic. The dc voltage V increases with increasing current difference $\Delta I$. If the dc voltage V exceeds the value $V_0$, then the comparison circuit 29 carries an output signal "0". By way of the value $V_0$ it is possible to monitor the threshold value $\Delta I_S$ at which the level of the output signal of the comparison circuit 29 changes. The inverter which is connected on the output side of the comparison circuit 29 inverts the signal level so that control of the switches 6, and 7 can occur as in the procedure described above.

With this second circuit configuration it is also possible to use as the material for the torus 12, instead of the magnetic glass, a ferromagnetic material which exhibits the known hysteresis effects, such as for example Permalloy. The voltages $U_{F1}(t)$ and $U_{F2}(t)$ then do not exhibit the rectangular pulses shown in FIG. 5, but the measuring principle remains qualitatively unaltered. Further details regarding the mode of operation of a Fluxgate Sensor can be found for example in the article *Fluxgate Sensor* in *Planar Microtechnology* by Thomas Seitz which was published in the journal *Sensors and Actuators* in Volumes A21 –A23 of the annual edition for 1990, on pages 799–802.

In the case of a further measuring circuit 13 the measuring coil 11 is integrated into the measuring circuit 13 in a series or parallel circuit in relation to a capacitive element with a capacitance C as part of an LC-resonance circuit. The measuring circuit 13 includes an electronic circuit which drives the resonance circuit in resonance and generates a signal which is proportional to the resonance frequency $\omega_R$ at which the resonance circuit oscillates. In the event of a sufficiently small current difference $\Delta I$ the torus 12 does not go into a condition of saturation and the measuring coil 11 has a high inductance $L_1$. With a sufficiently high current difference $\Delta I$ the torus 12 goes into a condition of magnetic saturation and the measuring coil 11 behaves like an air coil with an inductance $L=L_{1B}$ which is greatly reduced in comparison with the value $L=L_1$. As the resonance frequency is given by $\omega_R=\omega_1=1/\sqrt{L_1C}$ in the normal case or $\omega_R=\omega_{1B}=1/\sqrt{L_{1B}C}$ in the event of an attempt at fraud, an attempt at fraud can be easily recognised. The measuring circuit 13 is designed to produce a signal for opening of the switches 6 and 7 when the resonance frequency $\omega_R$ exceeds a predetermined value. As the resonance frequency $\omega_R$ at a fixedly predetermined value of the capacitance C only depends on the impedance L of the measuring coil 11, this measuring method corresponds to an impedance measurement.

The above-described solutions for preventing telephoning with a telephone connected to the telephone station 1 (FIG. 1) as the circuit 23 are based on the use of a magnetic material whose magnetisation curve is not linear in the range of the current difference $\Delta I$ to be measured, but has saturation effects which can be utilised for example in the ways described above for interrupting the telephone connection in the event of an attempt at fraud. Now described hereinafter is a solution which prevents telephoning if the circuit 23 is a circuit for suppressing the fee charge pulses.

The coils 8 and 9 are wound in the opposite directions so that the currents $I_1$ and $I_2$ produce in the torus 12 a magnetic field H which, as indicated above, is proportional to the difference between the currents $I_1-I_2$, the direction of the currents $I_1$, and $I_2$ being defined in FIG. 1 by arrows. In that respect it is immaterial whether the currents $I_1-I_2$ are direct or alternating currents. Both coils 8 and 9 together have the inductance $L_{tot}=0$. While the alternating current pulse $h_1$, (FIG. 1) is in the same current direction as the direct current $I_1$, the alternating current pulse $h_2$ is in a current direction which is reversed relative to the direct current $I_2$. The coils 8 and 9 therefore represent a non-vanishing inductance for the charge pulses which are formed by the alternating current pulses $h_1$, and $h_2$. The coils 8, 9, the torus 12 and the measuring coil 11 therefore behave in relation to the alternating current pulses $h_1$, and $h_2$ like a transformer. To answer the question whether a circuit 23 which weakens or even suppresses the charge pulses connects the tapping A to earth m, it is therefore provided that the property of impedance conversion of the transformer is put to use: the measuring circuit 13 is designed to determine the impedance of the measuring coil 11 which in this case is to be considered as the input impedance $Z_{Te}$ of the transformer. The input impedance $Z_{Te}$ of the transformer is dependent on the output impedance $Z_{Ta}$ of the transformer which is determined by the loading of the transformer. The input impedance $Z_{Te}$ therefore depends on the presence or absence of the circuit 23.

A circuit 13 for measuring the input impedance of the transformer is shown in FIG. 5. It has an ac voltage generator 31, a resistor 32, a voltage measuring device 33 and an evaluation circuit 34. The ac voltage generator 31 which produces a voltage of predetermined amplitude and predetermined frequency $\omega_T$ and the resistor 32 are connected in series and the resistor 32 is of high resistance relative to the input impedance $Z_{Te}$ so that an alternating current of predetermined amplitude flows through the measuring coil 11. The frequency $\omega_T$ is selected to be approximately equal to the frequency of the alternating current pulses $h_1$, and $h_2$ and is therefore about 50 Hz. The voltage measuring device 28 measures the ac voltage across the measuring coil 11 and supplies a dc voltage V to the evaluation circuit 34, which is proportional to the input impedance $Z_{Te}$ of the transformer. As can be seen from FIG. 1 the output impedance $Z_{Ta}$ of the transformer formed by the coils 8, 9, the torus 12 and the measuring coil 11 is also dependent on the impedances which are present in the telephone exchange 5 in the lines 2 and 3. The telephone station 1 is therefore preferably designed, on being brought into operation or also periodically, to determine the input impedance $Z_{Te}$ and to store it as a value $Z_{Te,\ norms}$ in the evaluation circuit 34. Then in operation of the telephone station 1 when the switches 6 and 7 are closed the evaluation circuit 34 determines the input impedance $Z_{Te}$ at regularly or stochastically distributed time intervals and compares it to the stored value $Z_{Te,\ normal}$. If the difference $Z_{Te}-Z_{Te,\ normal}$ exceeds a predetermined value, the evaluation circuit 34 produces an output signal which causes opening of the switches 6 and 7.

The facts which are important for understanding of the invention are hereby described in principle. The measuring circuit shown in FIG. 2 and the measuring circuit shown in FIG. 5 which are designed for detecting different kinds of fraud can now be combined in a manner apparent to the man skilled in the art so that the telephone station is designed to recognise and prevent different kinds of fraud.

We claim:

1. A telephone station (1) having a handset (14), first and second switches (6, 7) by means of which the telephone station (1) can be connected by way of two lines (2, 3) to a telephone exchange (5), wherein when the switches (6, 7) are closed the telephone station (1) can be supplied with electrical energy from the telephone exchange (5) by way of the lines (2, 3), and a circuit member (10), the first switch (6), the circuit member (10) and the second switch (7) being electrically connected in series and the switches (6, 7) being actuable by the handset (14) of the telephone station (1), characterised in that for preventing fraud installed between the first switch (6) and the circuit member (10) is a first coil (8), that installed between the circuit member (10) and the second switch (7) is a second coil (9), that the two coils (8, 9) are wound in opposite directions around a body (12) of magnetic material, that there are provided means (11, 13; 11, 26, 27) for producing an alternating magnetic field ($H_M(t)$; $H_F(t)$) in the body (12), that there are provided means (11, 13; 11, 28, 29; 11, 28, 29, 30) for measuring the time derivation dB/dt of the magnetic induction B(t) which occurs in the body (12), and that there are provided means (13; 29) for producing a signal for opening of the switches (6, 7) if the measured derivation dB/dt fulfills predetermined criteria.

2. A telephone station according to claim 1 characterised in that the magnetic material approximately has a magnetisation curve B(H) which for a magnetic field H whose magnitude $^3H^3$ is lower than a value $H_K$ has a magnetic permeability ($\mu_R$) which is large in relation to the number one and which for a magnetic field H whose magnitude $^3H^3$ is greater than the value $H_K$ has a low magnetic permeability ($\mu_r$), that the transitional range $\Delta H$ from the high to the low permeability ($\mu_r$) is small relative to the value $H_K$ and that the remanence $B_r$ is low relative to the saturation value $B(H_K)$.

3. A telephone station according to claim 2 characterised in that the magnetic material is a metal glass.

4. A telephone station according to claim 2 characterised in that the means for producing the alternating magnetic field ($H_M(t)$) is an alternating current source which is formed from an ac voltage generator (26) and a resistor (27) and to which a measuring coil (11) wound around the body (12) is connected, and that the amplitude of the magnetic field ($H_M(t)$) is low relative to the value $H_K$.

5. A telephone station according to claim 1 characterised in that the means for producing the alternating magnetic field ($H_F(t)$) is an alternating current source which is formed from an ac voltage generator (26) and a resistor (27) and to which a measuring coil (11) wound around the body (12) is connected, and that the amplitude of the alternating magnetic field ($H_F(t)$) is so great that magnetic saturation effects occur in the body (12).

6. A telephone station according to claim 5 characterised in that the current flowing through the measuring coil (11) has a fundamental frequency $\omega_F$, and that the means (11, 13; 11, 28, 29, 30) for measuring the time derivation dB/dt include a voltage measuring device (28) and a band pass filter (30) which is transmitting for the second harmonic at the frequency $2*\omega_F$.

7. A telephone station (1) having a handset (14), first and second switches (6, 7) by means of which the telephone station (1) can be connected by way of two lines (2, 3) to a telephone exchange (5), wherein when the switches (6, 7) are closed the telephone station (1) can be supplied with electrical energy from the telephone exchange (5) by way of the lines (2, 3), and a circuit member (10), the first switch (6), the circuit member (10) and the second switch (7) being electrically connected in series and the switches (6, 7) being actuable by the handset (14) of the telephone station (1), characterised in that for preventing fraud installed between the first switch (6) and the circuit member (10) is a first coil (8), that installed between the circuit member (10) and the second switch (7) is a second coil (9), that the two coils (8, 9) are wound in opposite directions around a body (12) of magnetic material, that a third coil is wound as a measuring coil (11) around the body (12) and that a signal for opening of the switches (6, 7) can be produced in dependence on the impedance (L) of the measuring coil (11).

8. A telephone station according to claim 7 characterised in that the measuring coil (11) is arranged in a resonance circuit, that there are provided means (13) which drive the measuring coil (11) in resonance and determine the resonance frequency ($\omega_R$), wherein the resonance frequency ($\omega_R$) is dependent on the impedance (L) of the measuring coil (11), and that the signal causes opening of the switches (6, 7) when the resonance frequency ($\omega_R$) exceeds a predetermined value.

9. A telephone station according to claim 7 characterised in that there is provided a circuit (31, 32, 33, 34) for determining the impedance (L) of the measuring coil (11) at the frequency ($\omega_T$) of the fee charge pulses.

10. A telephone station according to claim 1 characterised in that the magnetic body (12) is a torus.

* * * * *